United States Patent [19]

Mabuchi et al.

[11] 4,020,245
[45] Apr. 26, 1977

[54] CELL ADAPTER

[75] Inventors: Kenichi Mabuchi; Yoshihisa Tsuchimochi, both of Tokyo, Japan

[73] Assignee: Mabuchi Motor Co. Ltd., Tokyo, Japan

[22] Filed: Oct. 31, 1975

[21] Appl. No.: 627,674

[30] Foreign Application Priority Data

Nov. 6, 1974   Japan ............... 49-133685[U]
Nov. 20, 1974  Japan ............... 49-142271[U]

[52] U.S. Cl. ............................................. 429/100
[51] Int. Cl.² ........................................ H01M 2/10
[58] Field of Search ............................... 136/173

[56] References Cited

UNITED STATES PATENTS 3,684,583   8/1972   Lehnen et al. .................. 136/173

Primary Examiner—Donald L. Walton

[57] ABSTRACT

A cell adapter is disclosed which comprises a hollow cylindrical body having an interior space for the insertion of a cell thereinto and having an exterior diametral size agreeing with the size of the cell receiving space of a cell powered electric appliance in which the cell is to be placed. The hollow cylindrical body can be formed as an monoblock molding unit, that is integral unit, and has resilient holding portions at its top for elastically holding the cell inserted into said interior space.

4 Claims, 5 Drawing Figures

CELL ADAPTER

BACKGROUND OF THE INVENTION

1. Field of the Invention

This invention relates to a cell adapter or, more particularly, to a cell adapter attachable to an electric cell that is not of a predetermined standard dimension in order to give a standard size, that adapter being so designed that the body of the adapter can easily be formed as an integral unit and that the cell can easily be inserted into or removed from the body as well as can be held firmly in place when inserted therein.

2. Description of the Prior Art

Electric cells used as power sources for various kinds of electric appliances are usually standardized in size such as UM1 type, UM2 type, UM3 type, etc., and in this respect the cell receiving space in the electric appliance is usually made of such a dimension as to properly accept cells of a standard size as mentioned above.

On the other hand, nickel-cadmium cells have recently been developed and are finding their use in many fields, for such a cell has so small an internal resistance that it can provide big discharge current, say several amperes, in spite of its small volume and can be quickly charged in several or ten and several minutes and, furthermore, it can be charged even after it has discharged until the voltage across it becomes almost zero.

Cells of this type can have sufficient capacity even if they are rather small in size and, in view of this, they are made of selected shapes and sizes which are different from the standards for conventional cells such as UM1, UM2, UM3, etc., so as to develop their own uses although there are some that have conventional standard sizes. It is desired, however, that these cells suited for their own uses, as mentioned above, could also be mounted in a cell receiving space designed for the accommodation of cells of a conventional standard size.

Recently, nickle-cadmium type cells of a standard size such as UM1, UM2, or UM3 have come into the market. However, such nickle-cadmium cells are expensive, and provision of cells of various sizes would make it impossible to expect the reduction of cost by mass-production. To enjoy the reduction of cost by mass-production, attempts have been made to use UM3 cells as UM2 or UM1 cells. For this purpose it has been proposed to provide cell adapters to be attached to nickle-cadmium cells so as to enable them to be placed in a conventional cell receiving space.

It is also to be noted that these nickel-cadmium cells are not only used as power source but also they are sometimes charged on a charger having a cell receiving space whose shape and size correspond to those of the cells' own. It is therefore desirable for the cell adapter not only to be attached to the cell in order to give it a desired outer dimension but also to be readily detached from the cell. This requires the cell adapter to hold the inserted cell by an elastic action in the direction of its diameter. Provision of such elastic holding means would make it difficult to make the cell adapter such as by solid molding of a synthetic resinous material.

SUMMARY OF THE INVENTION

An object of the invention is to provide a cell adapter as described above which is readily attachable to and detachable from a cell of a non-standard size and which may be made at low cost by solid molding.

Another object of the invention is to provide a cell adapter comprising a hollow cylindrical body for insertion of a cell thereinto and a resilient holding means provided at the top of the cylindrical body for elastically holding the cell inserted in said cylindrical body.

Still another object of the invention is, in a cell adapter with such resilient holding means, to reduce the elastic fatigue of the resilient holding means in a simple way.

Figure 1:
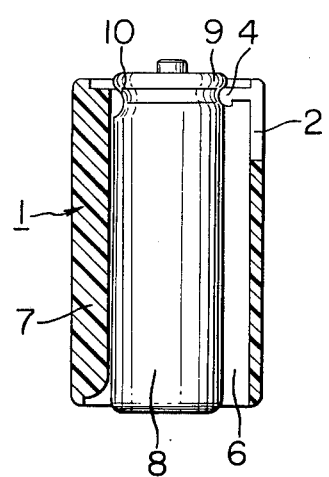
FIG. 1 is a cross-sectional view, taken along line X-X' shown in FIG. 2, of an embodiment of the cell adapter in accordance with the invention, with an nickel-cadmium type cell of a longitudinal dimension equal to that of the conventional UM3 type inserted in the adapter body so as to assume the standard size of a UM2 cell.
Figure 2:
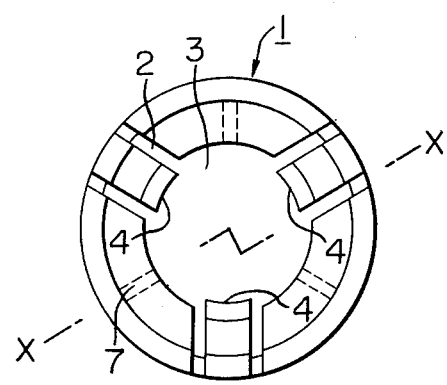
FIG. 2 is a plan view of the cell adapter body.

DETAILED DESCRIPTION OF THE EMBODIMENT:

Referring to FIGS. 1, 2, 3 and 4, the adapter body comprises a hollow cylindrical body 1 made of such as synthetic resin with its outer diameter being equal to that of a conventional UM2 cell. The top end of the body 1 is provided with resilient holding means 5 made by forming slits 2, an opening 3 and tongues 4. The tongues 4 are resiliently supported. The interior space or cavity 6 of the body 1 is formed with ribs 7 extending inwardly from the inner wall of the body 1 toward the center axis thereof in order to position the cell 8 centrally of the cavity 6.

Figure 3:
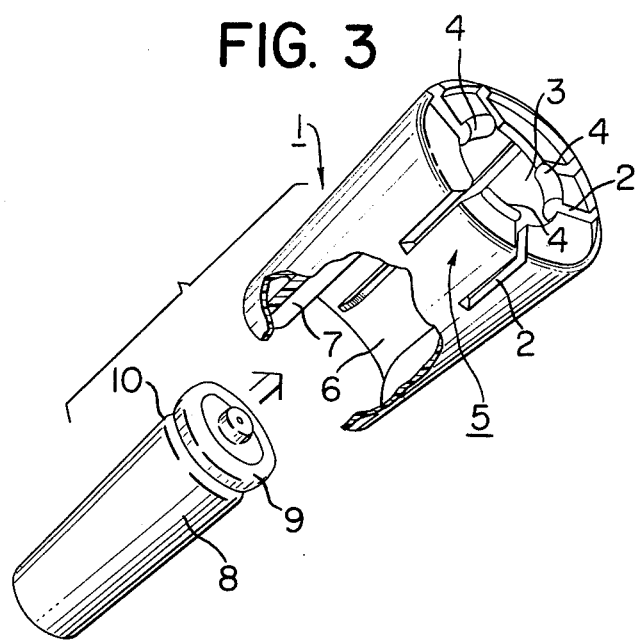
FIG. 3 is a perspective view, with part broken away, of the adapter body and the nickel-cadmium cell, showing how they engage.
Figure 4:
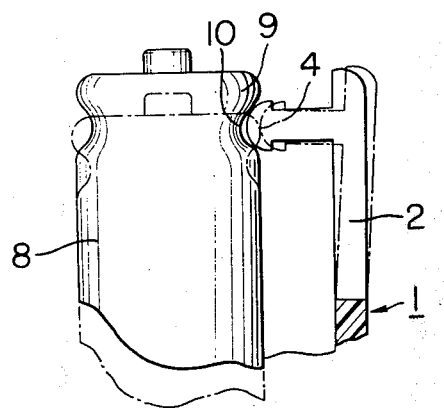
FIG. 4 shows the relation between said nickel-cadmium cell and the tongue member for holding the cell elastically.

When the cell 8 is inserted into the body 1 from its bottom as indicated by the arrow shown in FIG. 3, the head 9 of the cell 8 pushes up the tongues 4 as shown by the dot-dash line in FIG. 4. When the groove 10 of the cell 8 comes to a position opposite the tongues 4, the latter which have once been pushed up as mentioned above return back down to the original position and engage said groove 10 of the cell 8 so as to hold it elastically as shown by the solid line in FIG. 4. The slits formed in the top end portion of the body 1 provide for the resilient construction of the tongues 4 and for said pushing up and returning operations.

As to how the cell 8 held elastically by tongues 4 can be removed from the adapter body 1, push the cell 8 on the positive electrode side, and the tongues 4 will be pushed down by the head 9 of the cell and come out of the engagement with groove 10 of the cell 8 which will then spring out of the body 1.

The body 1 in accordance with the invention can be molded as an integral whole simply by using a pair of male and female molds movable in the longitudinal direction of the body 1. Thus, the male mold is so formed as to have an outside profile corresponding to the inside profile of the hollow cylindrical body including the ribs 7, whereas the female mold is so formed as to have an inside profile corresponding to the outside profile of said hollow cylindrical body, provided with projections complementary to the slits 2. Moving these two molds apart after molding will yield a solidly formed cell adapter of the invention.

Figure 5:
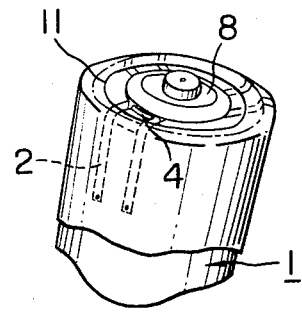
FIG. 5 shows part of another embodiment of the cell adapter.

FIG. 5 shows another embodiment of the cell adapter in accordance with the invention. Although the cell adapter shown in FIGS. 1 to 4 is formed with slots 2 for giving resilient support to the tongues 3 in order to facilitate the insertion and the removal of the cell 8, there is generally a possibility of the tongues 4 becoming incapable of holding the cell resiliently enough because of elastic fatigue with increasing number of times of their use.

In view of this, means for reducing such elastic fatigue is provided to the cell adapter of which part is shown in FIG. 5 in accordance with the invention.

In FIG. 5, the reference numeral 11 denotes a film of a thermo-contractive synthetic resin provided in accordance with the invention, covering at least the outside circumferential surface of the body 1 where the slits 2 exist. Other numerals correspond to those in FIG. 1.

When a cell 8 is fully inserted in the body 1 so covered with the synthetic resinous film 11 over the outside surface, it will be elastically held by the tongues 4 receiving the elastic force due to the slits 2 plus the elastic force given by said synthetic resinous film 11 in the direction toward the center axis of the body 1.

It is needless to say that the synthetic resinous film described above in no way affects such yielding or returning motion of the tongue 4 as shown in FIG. 4 at the time of insertion of the cell 8. This is true also of the removal of the cell. From the foregoing description, it is understood that cells which are not standardized in size or do not have a selected standard size can be made to assume a standard size by applying the adapter in accordance with the invention. The adapter is readily detachable, very simple in construction and can be made at low cost by solid molding. Moreover, the film 11 of a synthetic resin covering at least the peripheral surface of the body 1 where the slits 2 exist ensures the elastic holding of the cell 8 inserted and prevents elastic fatigue of the cell holding means formed by the slits 2 and tongues 4.

Although, in the above embodiments, the adapter has been described as being applied to nickel-cadmium cells, it may, of course, be applicable to other various types of cells in accordance with the invention.

We claim:

1. A cell adapter comprising a hollow cylindrical body having an outer diameter agreeing with a predetermined diametral size, an opening formed in the top end face of said hollow cylindrical body, slits cut in said top end face and the peripheral wall of said hollow cylindrical body and extending from said peripheral wall of the hollow cylindrical body to said opening thereof, and tongue members formed in said top end face by said slits, the tips of said tongue members together form a circle, said slits and tongue members providing a resilient means for elastically holding the cell inserted.

2. A cell adapter as claimed in claim 1, in which ribs for supporting the cell are formed on the inner wall surface of the hollow cylindrical body.

3. A cell adapter as claimed in claim 1, further comprising a film of thermo-contractive synthetic resin covering at least the outer surface of said hollow cylindrical body where said slits exist.

4. A cell adapter as claimed in claim 2, further comprising a film of thermo-contractive synthetic resin covering at least the outer surface of said hollow cylindrical body where said slits exist.

* * * * *